US012741825B2

(12) United States Patent
Rodríguez Mosquera

(10) Patent No.: US 12,741,825 B2
(45) Date of Patent: Sep. 22, 2026

(54) PALLET CONVEYING MODULE

(71) Applicant: MECALUX, S.A., Cornellà de Llobregat (ES)

(72) Inventor: Sergio Rodríguez Mosquera, Cornellà de Llobregat (ES)

(73) Assignee: MECALUX, S.A., Cornellà de Llobregat (ES)

( * ) Notice: Subject to any disclaimer, the term of this patent is extended or adjusted under 35 U.S.C. 154(b) by 107 days.

(21) Appl. No.: 18/994,627

(22) PCT Filed: Aug. 16, 2023

(86) PCT No.: PCT/ES2023/070516
§ 371 (c)(1),
(2) Date: Feb. 5, 2025

(87) PCT Pub. No.: WO2024/052582
PCT Pub. Date: Mar. 14, 2024

(65) Prior Publication Data

US 2026/0015185 A1 Jan. 15, 2026

(30) Foreign Application Priority Data

Sep. 7, 2022 (ES) ............................... ES202230795

(51) Int. Cl.
*B65G 47/88* (2006.01)
*B65G 17/00* (2006.01)
*B65G 43/08* (2006.01)

(52) U.S. Cl.
CPC ....... *B65G 47/8823* (2013.01); *B65G 17/002* (2013.01); *B65G 43/08* (2013.01);
(Continued)

(58) Field of Classification Search
CPC ............ B65G 47/8815; B65G 47/8823; B65G 17/002; B65G 43/08; B65G 47/8892;
(Continued)

(56) References Cited

U.S. PATENT DOCUMENTS 5,211,276 A * 5/1993 Clopton ............. B65G 47/8823 198/463.4
5,860,505 A * 1/1999 Metzger ............. B65G 47/8823 198/463.6
(Continued)

FOREIGN PATENT DOCUMENTS

CN 107902393 A 4/2018
EP 0860381 A1 8/1998
(Continued)

*Primary Examiner* — James R Bidwell
(74) *Attorney, Agent, or Firm* — Bayramoglu Law Offices LLC

(57) ABSTRACT

A pallet conveying module, including a support structure on which there is arranged a rolling travel track configured to displace the pallets, and a retaining system to stop the pallet on said track. The retaining system comprises a first non-motorized mechanically operated braking device having a retractable region that rotates with respect to an shaft with a stop projection provided to abut with support legs of the pallet to be stopped, such that in a standby position, the retractable region is on an inclined plane with respect to the horizontal plane, while in a stop position the stop projection is in contact against a leg of the pallet; and a second motor operated braking device, located prior to the first mechanically operated braking device, which has a cam system defined by first and second retractable stops located in different positions.

7 Claims, 7 Drawing Sheets

(52) U.S. Cl.
CPC ..... *B65G 47/8815* (2013.01); *B65G 47/8892* (2013.01); *B65G 2201/0267* (2013.01); *B65G 2203/0233* (2013.01); *B65G 2203/044* (2013.01)

(58) Field of Classification Search
CPC .... B65G 2201/0267; B65G 2203/0233; B65G 2203/044
USPC ........................................................ 198/345.3
See application file for complete search history.

(56) References Cited

U.S. PATENT DOCUMENTS

| | | | | |
|---|---|---|---|---|
| 6,575,286 | B1 * | 6/2003 | Mills | B65G 47/261<br>193/35 G |
| 7,111,721 | B1 * | 9/2006 | Turner | B65G 47/8823<br>198/463.4 |
| 10,752,157 | B1 * | 8/2020 | Zeller | B65G 67/24 |
| 2004/0251112 | A1 * | 12/2004 | Freudelsperger | B65G 35/06<br>198/415 |
| 2007/0175729 | A1 * | 8/2007 | Robinson | B65G 47/8823<br>193/35 A |
| 2019/0152705 | A1 * | 5/2019 | Guo | B65G 13/075 |
| 2020/0255227 | A1 * | 8/2020 | Lundberg | B65G 47/8884 |

FOREIGN PATENT DOCUMENTS

| | | | | | |
|---|---|---|---|---|---|
| EP | 1457441 | A1 | * | 9/2004 | B65G 47/8823 |
| FR | 2257521 | A1 | | 8/1975 | |
| GB | 1470439 | A | | 4/1977 | |
| JP | 2-265812 | | * | 10/1990 | B65G 47/53 |
| WO | WO-2019054920 | A1 | * | 3/2019 | B65G 13/075 |
| WO | WO-2019070180 | A1 | * | 4/2019 | B65G 47/268 |
| WO | WO-2020259913 | A1 | * | 12/2020 | B65G 47/8823 |

* cited by examiner 1
2
10
10
11
31
3
30
9
30
3
31
80
80
81

1
2
3
3
5
5
5
5
6
6
7
7
7
7
7
8
12

80
82
8
80
83
81
82
83
80
82

83
81
82
83
80

PALLET CONVEYING MODULE

CROSS-REFERENCE TO THE RELATED APPLICATIONS

This application is the national phase entry of International Application No. PCT/ES2023/070516, filed on Aug. 16, 2023, which is based upon and claims priority to Spanish Patent Application No. P202230795, filed on Sep. 7, 2022, the entire contents of which are incorporated herein by reference.

TECHNICAL FIELD

The purpose of this application is to register a pallet conveying module.

More specifically, the invention proposes the development of a pallet conveying module intended for an automatic pallet storage facility that is operated by stacker cranes, which receive and/or deliver loads in combination with conveyor modules, the module being provided with two retaining means acting on the pallets.

The object of the invention is part of the field of logistics and more precisely in an automatic pallet storage facility, operated by stacker cranes that receive and/or deliver loads in combination with conveyors.

BACKGROUND

In the logistics sector, facilities for conveying pallets or pallets provided for handling products are well known, where there is provided a ramp or track that defines a route or path to be followed by the pallets provided with displacement means, such as for example, chain strands, such as two or three chain strands running parallel to one another, which are operated by motor means. To handle the pallets, stacker cranes provided with a cradle with a double set of telescopic forks can be used.

To ensure that the pallets stop at a pre-established stop area for subsequent handling or reception of the pallets, braking or retaining means are used.

Currently, many different pallet models are used for storage facilities of this type, although the two types of pallets most commonly used are the so-called Euro pallets (UNE-EN 13698-1=2003) and industrial pallets (UNE-EN_13698-2=2003), which essentially differ in their dimensions, the Euro pallet having a standard width×length dimension of 800×1200 mm and the industrial pallet having a standard width×length dimension of 1000×1200 mm.

However, the use of pallets with different dimensions requires specific positioning so that the telescopic forks that form part of the double-cradle stacker crane used in the displacement movements of the pallets can access below the pallets through the space free space between the outer and central legs present in the lower part of the pallet. This specific positioning requires more movements to be carried out by the stacker crane, thus increasing the execution times during the handling of the pallets, causing the facility to have a lower operating performance.

Another drawback detected is the fact that when working with the two types of pallets, it is necessary to adapt the stopping mechanism of a palletized load at a specific point on the conveyor, depending on the measurements of the pallet, thus increasing the complexity of the facility. This complexity can be increased the larger the pallet conveying facility is. Accordingly, the execution time of the facility, as well as the costs, are increased.

It is known from prior art document no. EP 0860381 A1 disclosing a pallet conveying module provided with a retaining system configured to stop a pallet on the travel track, wherein common parts are part of the preamble of claim 1.

Furthermore, the applicant is currently unaware of any invention that has all of the features described in this specification.

SUMMARY

The present invention has been developed with the aim of providing a pallet conveying module that is configured as a novelty within the field of application and solves the previously mentioned drawbacks, further contributing other additional advantages that will be obvious from the description below.

It is therefore an object of the present invention to provide a pallet conveying module, of the type that comprises a support structure on which there is arranged a travel track on which a pallet provided with a loading surface and support legs, or also called support blocks, can be displaced, the travel track including displacement means to displace the pallet and a retaining system provided to stop the pallet on the travel track at a certain point.

In particular, the invention is characterized by the fact that the retaining system comprises:

- a first non-motorized mechanically operated braking device having a retractable region capable of rotating with respect to a shaft with a stop projection, the stop projection being provided to abut with support legs or blocks of the pallet, the displacement of the retractable element being by contact with at least one leg of the pallet, in such a way that in a standby position, the retractable region is on an inclined plane with respect to the horizontal plane, while in a stop position the retractable element is on a horizontal plane, the stop projection abutting against a leg of the pallet; and
- a second motor operated braking device, which is located prior to the first mechanically operated braking device, which has a cam system that defines first and second retractable stops that are located in different longitudinal positions with respect to the axis of displacement or advancement of the pallets to be handled, being configured in such a way that, depending on the dimensions of the pallet to be stopped, the first or second retractable stop acts.

As a result of these features, a module is obtained with a retaining system suitable for working with different types of pallets simultaneously, that is, European-format pallets and industrial pallets, which has the following advantages:

- it solves the problem of presenting two palletized loads in the required positions, so that the telescopic forks of a double-cradle stacker crane can access under the pallets, through the existing free space, the legs located at the ends and the central leg;
- it solves the problem of presenting two palletized loads in the required positions, so that the telescopic forks of the stacker crane, preferably with a double cradle, can access under the pallets, through the free space between the legs located at the ends of the pallet and the central leg, when the pallets have the same size or different sizes;
- it solves the problem of retaining two pallets at the load points, maintaining a specific and fixed distance between the central axes of both pallets;

- it avoids having to adapt the stopping mechanism of a palletized load at a specific point on the conveyor, depending on the measurements of the pallet.

Alternative embodiments of the invention are described in the dependent claims.

The first mechanically operated braking device acts by direct contact with the pallet, so that it does not require motorized means for its operation.

The second motor operated braking device can be adapted to the different dimensions of the pallets by means of a simple solution that facilitates the manufacturing process thereof and, consequently, also reduces manufacturing costs.

Thus, the described pallet conveying module represents an innovative structure with structural and constituent features heretofore unknown for its intended purpose, reasons which, taken together with its usefulness, provide it with sufficient grounds for obtaining the requested exclusivity privilege.

Other features and advantages of the pallet conveyor module object of the present invention will be evident in light of the description of a preferred, but not exclusive, embodiment which is illustrated by way of a non-limiting example in the drawings which are attached, wherein:

DETAILED DESCRIPTION OF THE EMBODIMENTS

Figure 1:
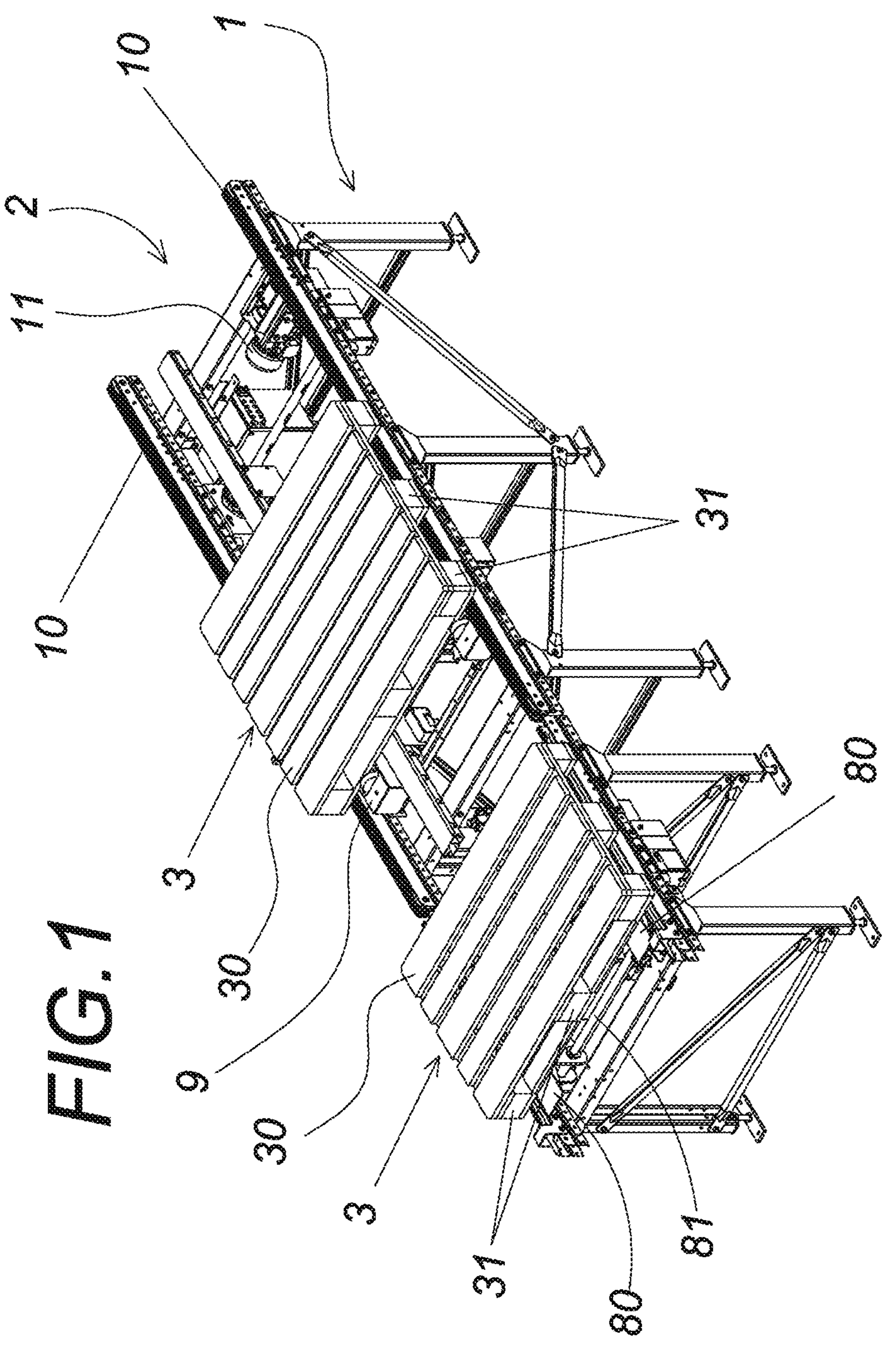
FIG. 1 is a perspective view of a pallet conveying module according to the present invention, on which load pallets are arranged.

In view of the aforementioned figures, and in accordance with the adopted numbering, one may observe therein a preferred exemplary embodiment of the invention, which comprises the parts and elements indicated and described in detail below.

Moreover, the terms first, second, third, and the like in the description and in the claims are used to distinguish between similar elements and not necessarily to describe a sequential or chronological order. The terms may be interchanged under appropriate circumstances and the embodiments of the invention may operate in sequences other than those described or illustrated herein.

Moreover, the terms upper, lower, up, down, and the like in the description and in the claims are used for descriptive purposes and not necessarily to describe relative positions.

An embodiment of the pallet conveying module comprises a support structure (1), formed from a plurality of metal profiles (5), reinforcing braces (6) located between profiles (5), as well as support elements (7) (see FIG. 2) that ensure the stability of the support structure (1). On the support structure (1) there is a linear travel track, generally indicated with the reference (2) in FIGS. 1 and 2, on which a plurality of pallets (3) can be displaced.

Said pallets (3) are of the type that are each provided with a load surface (30) and a series of support legs (31) located below the load surface (30).

Figure 2:
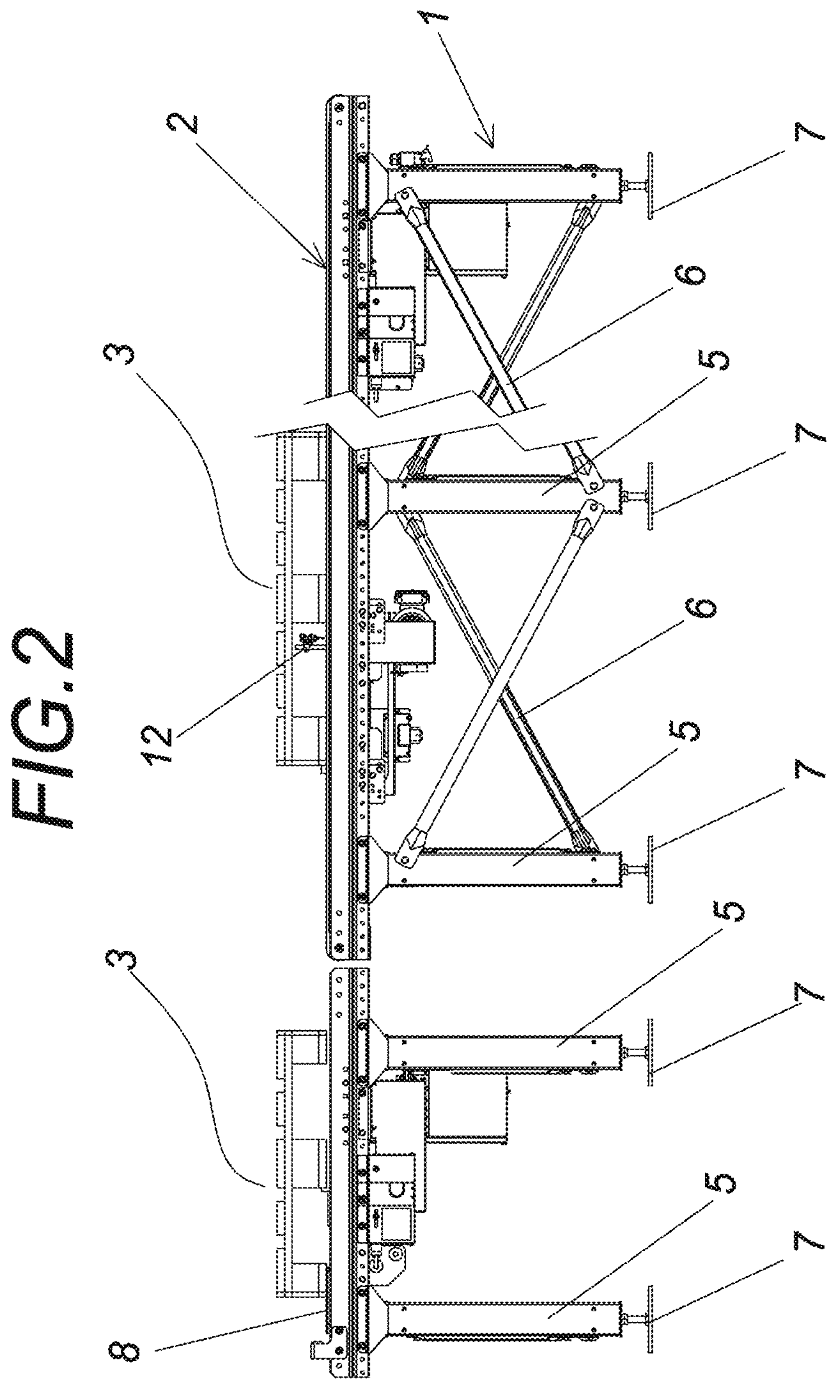
FIG. 2 is a side elevational view of the module depicted in FIG. 1.
Figures 3, 4:
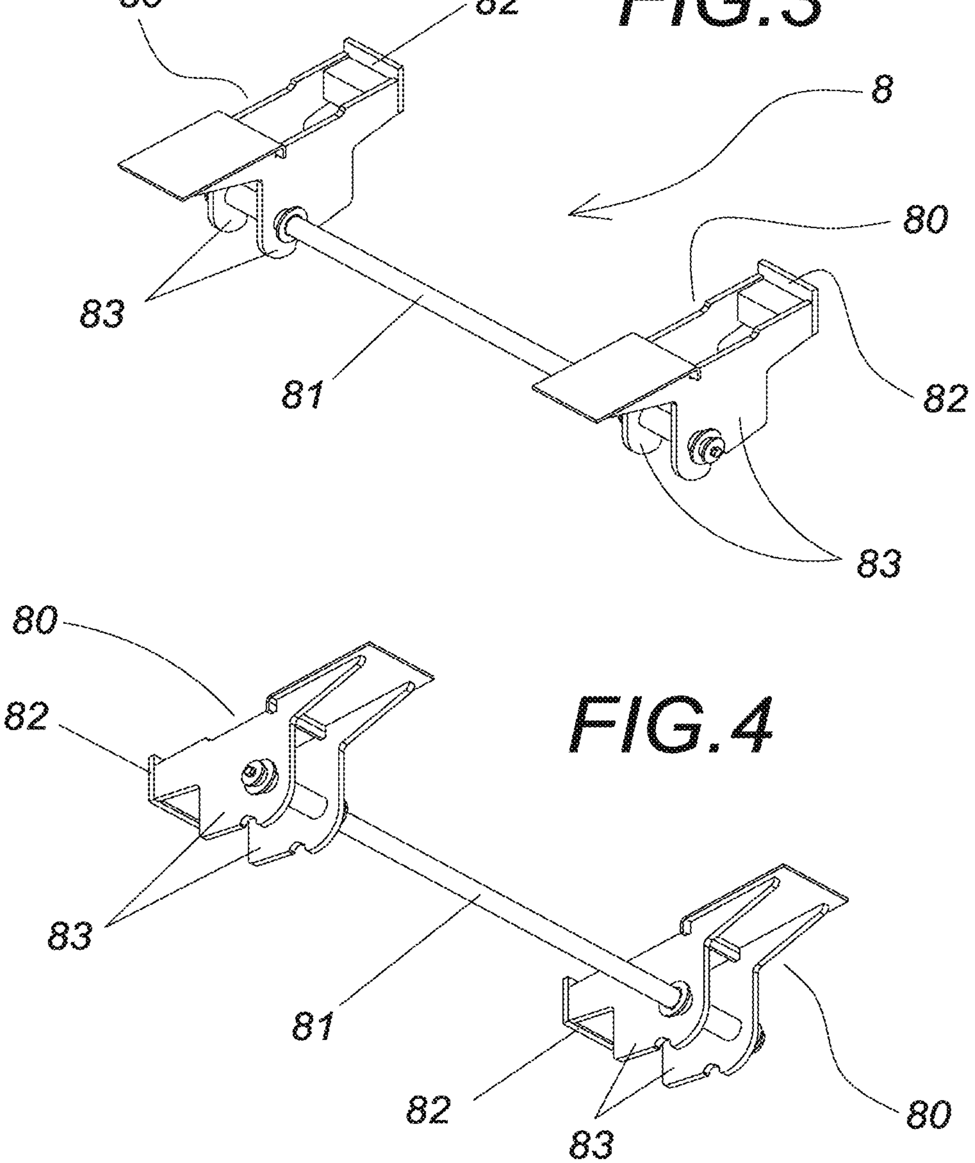
FIG. 3 is a top perspective view of the first mechanically operated braking device.
FIG. 4 is a bottom perspective view of the first mechanically operated braking device.
Figure 5:
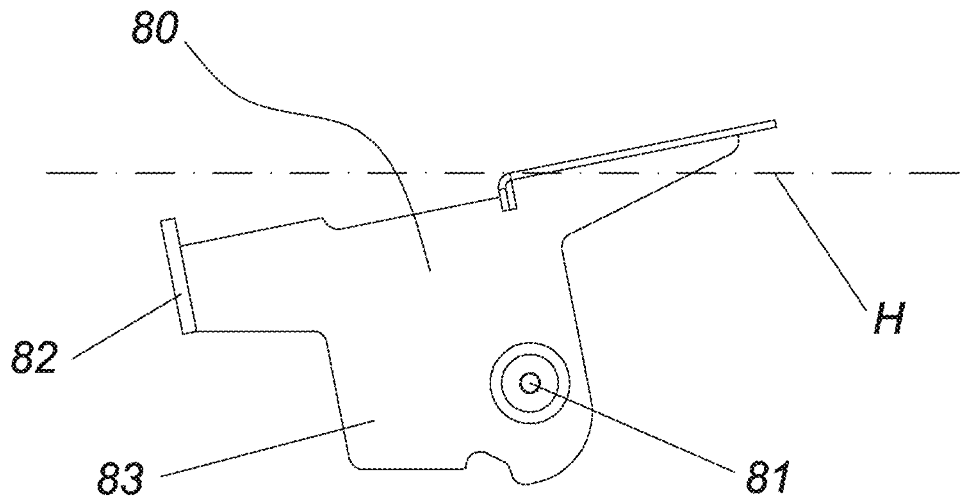
FIG. 5 is a side elevational view showing the first braking device in a standby position.
Figure 6:
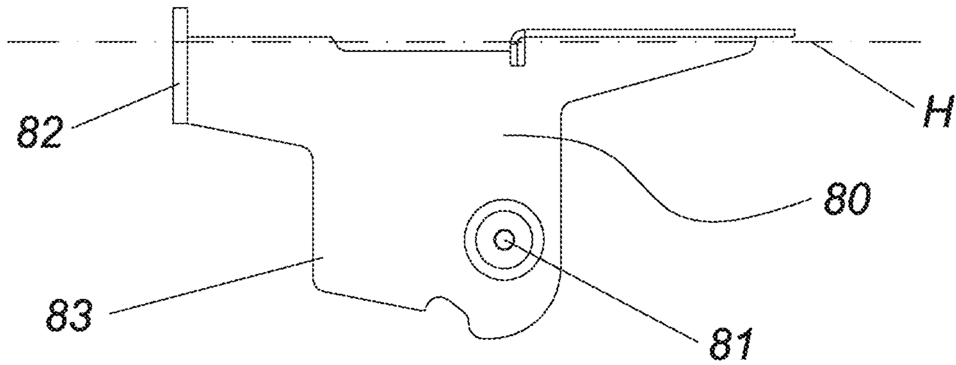
FIG. 6 is a side elevational view showing the first braking device in an activated position.

To displace the pallets (3), the travel track (2) includes automated displacement means and a retaining system (described later in greater detail) that is especially intended to stop the pallets (3) on the travel track (1) at certain points, as shown in FIGS. 1 and 2, regardless of the dimensions of the pallets (3). In this way, the unwanted collision of the pallets (3) is avoided.

The previously mentioned displacement means comprise a series of chain strands (10), at least one of them operated by means of a geared motor (11), which run spaced apart and parallel to one another, on which the legs of the pallets (3) rest during the displacement of the pallets. The description of the chain strands (10) will not go into greater detail as they are known in the art.

As regards the retaining system to stop the pallets in predetermined positions, it is provided with a first braking device, generally indicated by reference (8), which can be seen in detail in FIGS. 2 to 6. This first braking device (8) is based on a non-motorized mechanical operation, which has retractable elements, each of them defined by retractable regions (80) capable of rotating with respect to a shaft (81), with a stop projection (82) located at one end of the part that forms the retractable region (80). This stop projection (82) is intended to abut with certain support legs (31) of the pallets (3) and in an operating position it consists of an extension that extends upwards with respect to a horizontal surface. The angular displacement of the retractable element is carried out by contact with at least one leg of the pallet, in such a way that in a standby position of the braking device (8), the retractable region (80) is on an inclined plane (see FIG. 5) with respect to the horizontal plane while, in a stop position (see FIG. 6), the retractable element is on a horizontal plane (H), the stop projection (82) abutting against a leg of the pallet (3).

Going into greater detail on the mechanically operated braking device for the pallet conveying module, it comprises the two retractable elements mounted at two opposite ends of the shaft (81), which is provided with fixing means to be coupled to the structure of the pallet conveying module, in such a way that each of the retractable elements is capable of rotating on itself. As can be seen, each of the retractable elements is made up of a body that has a first flat region at one end and a stop extension at the opposite end that corresponds to the stop projection (82). The body that makes up the retractable element also has two lower plates (83) arranged parallel and attached to one another, and each of them provided with a through hole for the passage of the shaft (81).

Figure 7:
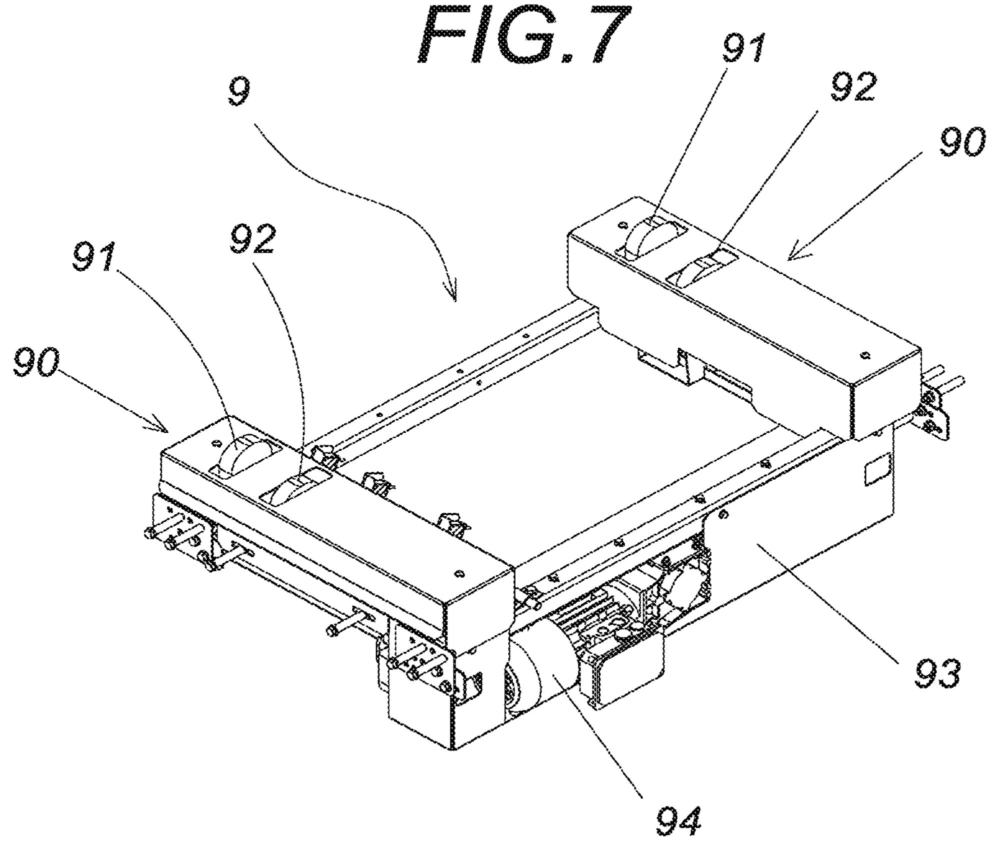
FIG. 7 is a perspective view of the second motor operated braking device according to the invention.

In addition, the system includes a second motor operated braking device, generally indicated by reference (9), and shown in detail in FIG. 7, located prior to the first mechanically operated braking device, in the displacement advancement direction of the pallets (3). This second motor operated braking device (9) has a cam system (90) that defines first and second retractable stops (91, 92) in the form of cams that are located in different longitudinal positions with respect to the axis of displacement of the pallets (3), in such a way that, depending on the dimensions of the pallets (3), the first or second stop acts. The two retractable stops (91, 92) are fixed to a rotating shaft (96).

Figure 8:
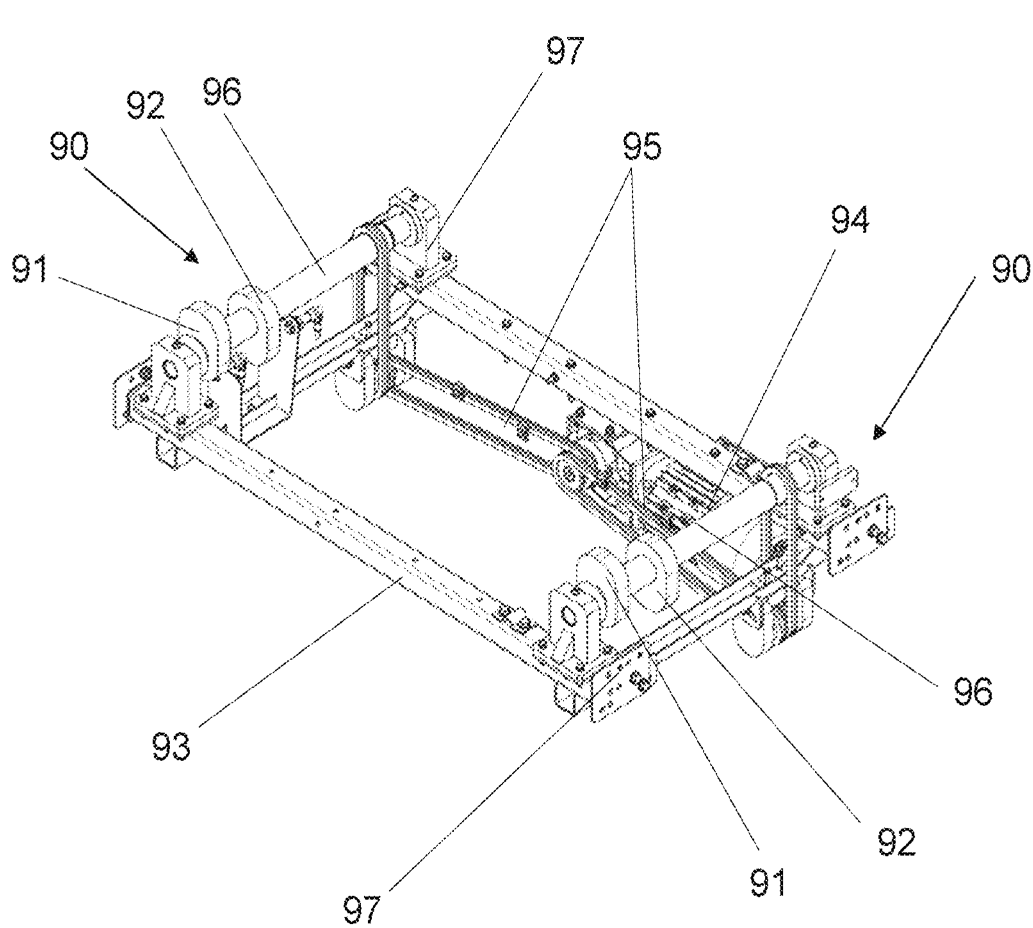
FIG. 8 is a top perspective view of the second motor operated braking device depicted in FIG. 7 where some parts have been removed to facilitate compression.
Figure 9:
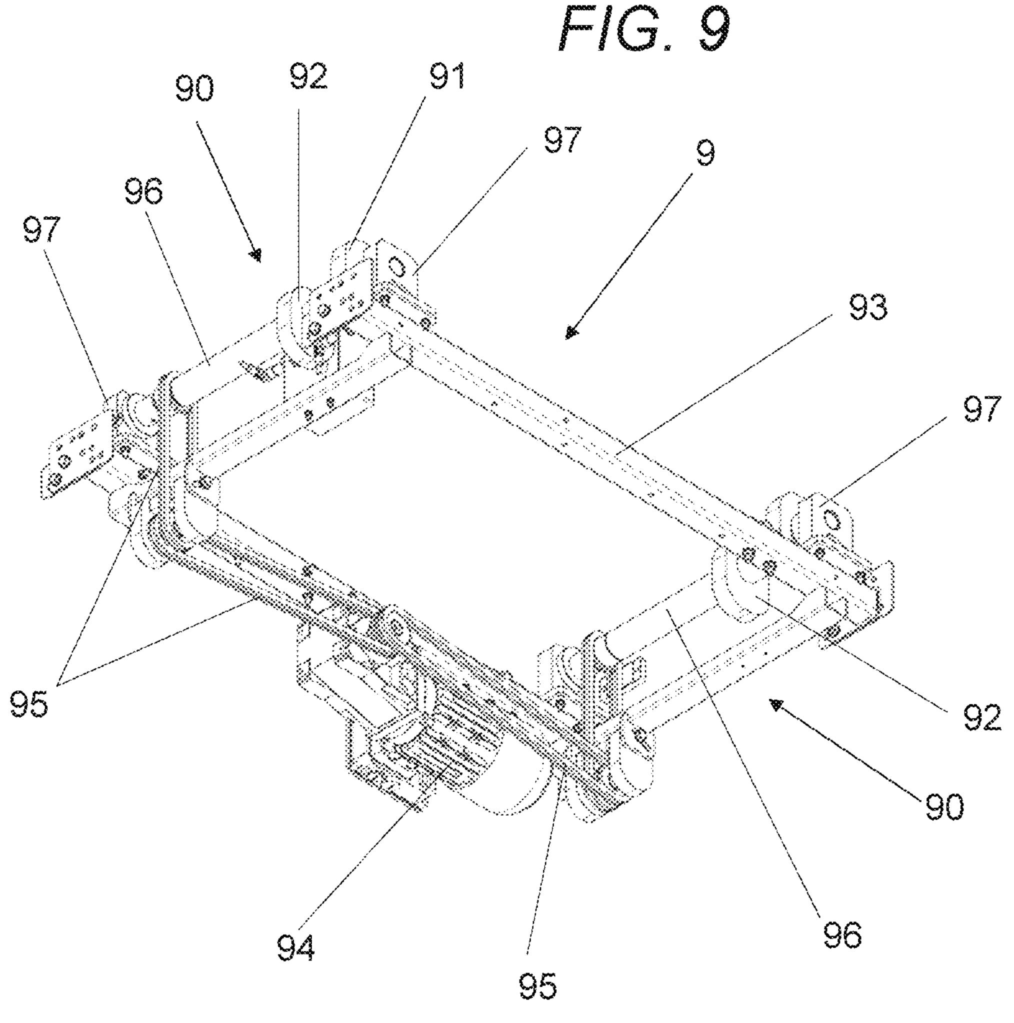
FIG. 9 is a bottom perspective view of the second motor operated braking device shown in FIGS. 7 and 8.

As shown in more detail in FIGS. 8 and 9, the second motor operated braking device (9) comprises a casing or frame (93), rectangular in shape, provided with a pair of assemblies spaced apart from one another, each assembly having the cam system (90) defined by the two retractable stops mounted on a coupling shaft, the coupling shaft being rotated through an electrical motorized means (94) managed by a software program. The electric motorized means (94) transmits the movement to the two cam systems (90) by means of belts (95) coupled to the rotating axes (96) of the respective cam systems (90). The ends of each of the rotary shafts (96) is coupled to a support (97).

As can be seen in FIGS. 1 and 2, the pallet conveying module is made up of two substructures adjacent to each other that define a single travel track, each of them provided with a support structure on which there is arranged a travel track, one of the substructures having the first non-motorized mechanically operated braking device installed therein, while the other substructure has the second motor operated braking device installed therein.

It should be mentioned that the two retractable stops (91, 92) acting as cams are equal to one another and are formed by a plate, with a substantially parallelepiped shape, that defines an upper end and a lower end in a functional state, which are in charge of abutting with the pallets (3). At all times, the two retractable stops are arranged in such a way that the upper and lower ends of each of them are offset in height from one another.

In addition, detection means configured to detect the presence of pallets on the travel track of the pallet conveying module are provided. Said detection means are connected and in data communication with the software program that acts on the second motor operated braking device, whereby there is an operation synchronization.

Said detection means comprise at least one photocell (12) located at a point on one side of the travel track (1), as shown in FIG. 2, so that when the photocell (12) detects the passage of a pallet in a certain position, it sends an operational signal to the electric motorized means (94) for the operation thereof and, accordingly, the movement of the cam system present in the motor operated braking device (9).

The details, shapes, dimensions and other accessory elements, used to manufacture the pallet conveying module of the invention, may be suitably substituted for others which do not depart from the scope defined by the claims which are included below.

What is claimed is:

1. A pallet conveying module, comprising a support structure where there is arranged a travel track configured for a displacement of pallets provided with a loading surface and support legs, the travel track comprising displacement means configured to displace the pallet and a retaining system configured to stop the pallet on the travel track at a predetermined point, wherein the retaining system comprises:

a first non-motorized mechanically operated braking device having a retractable region allowed for rotating with respect to a shaft with a stop projection, the stop projection being provided to abut with the support legs of the pallet to be stopped, a displacement of a retractable element being by contact with at least one leg of the pallet, wherein in a standby position, the retractable region is on an inclined plane with respect to a horizontal plane, while in a stop position the retractable element is on the horizontal plane, the stop projection abutting against a leg of the pallet; and wherein a second motor operated braking device, wherein the second motor operated braking device is located prior to the first non-motorized mechanically operated braking device, wherein the second motor operated braking device has a cam system, the cam system is defined by first and second retractable stops, and the first and second retractable stops are located in different longitudinal positions with respect to an axis of displacement or advancement of the pallets to be handled, the first and second retractable stops being configured in such a way that, depending on dimensions of the pallet to be stopped, the first or second retractable stop acts.

2. The pallet conveying module according to claim 1, wherein the pallet conveying module is made up of two substructures adjacent to each other defining a single travel track, each of the two substructures is provided with the support structure where there is the travel track, a first one of the two substructures has the first non-motorized mechanically operated braking device installed therein, while a second one of the two substructures has the second motor operated braking device installed therein.

3. The pallet conveying module according to claim 1, wherein the pallet conveying module comprises detection means to detect a presence of pallets on the travel track, wherein the detection means are linked in data communication with a software program, wherein the software program acts on the second motor operated braking device.

4. The pallet conveying module according to claim 3, wherein the detection means comprise at least one photocell.

5. The pallet conveying module according to claim 1, wherein the displacement means comprise a plurality of chain strands, the plurality of chain strands run parallel to each other along the travel track, wherein the legs of the pallets rest on at least two chain strands.

6. The pallet conveying module according to claim 2, wherein the pallet conveying module comprises detection means to detect a presence of pallets on the travel track, wherein the detection means are linked in data communication with a software program, wherein the software program acts on the second motor operated braking device.

7. The pallet conveying module according to claim 6, wherein the detection means comprise at least one photocell.

* * * * *